(12) United States Patent
Hettenkofer et al.

(10) Patent No.: US 10,746,109 B2
(45) Date of Patent: Aug. 18, 2020

(54) MONITORING APPARATUS FOR A PRESSURE TANK, AND PRESSURE TANK

(71) Applicant: Bayerische Motoren Werke Aktiengesellschaft, Munich (DE)

(72) Inventors: Simon Hettenkofer, Munich (DE); Klaus Szoucsek, Haimhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 32 days.

(21) Appl. No.: 15/379,558

(22) Filed: Dec. 15, 2016

(65) Prior Publication Data

US 2017/0122225 A1    May 4, 2017

Related U.S. Application Data

(63) Continuation of application No. PCT/EP2015/059649, filed on May 4, 2015.

(30) Foreign Application Priority Data

Jun. 16, 2014   (DE) .................. 10 2014 211 503

(51) Int. Cl.
*F02M 21/02*  (2006.01)
*F17C 5/00*  (2006.01)
(Continued)

(52) U.S. Cl.
CPC ....... *F02D 19/027* (2013.01); *F02M 21/0206* (2013.01); *F02M 21/0221* (2013.01);
(Continued)

(58) Field of Classification Search
CPC ....... Y02E 60/321; Y02T 10/32; Y02T 90/32; F17C 2221/012; F17C 2223/036;
(Continued)

(56) References Cited

U.S. PATENT DOCUMENTS 4,788,648 A * 11/1988 Ferretti .................. G01F 23/16
                                                340/618
5,146,783 A *  9/1992 Jansche ................. G01F 23/168
                                                73/301
(Continued)

FOREIGN PATENT DOCUMENTS

CN    102713405 A   10/2012
CN    103256480 A    8/2013
(Continued)

OTHER PUBLICATIONS

International Search Report (PCT/ISA/210) issued in PCT Application No. PCT/EP2015/059649 dated Jun. 24, 2015 with English translation (seven pages).

(Continued)

*Primary Examiner* — Lindsay M Low
*Assistant Examiner* — Teuta B Holbrook
(74) *Attorney, Agent, or Firm* — Crowell & Moring LLP

(57) ABSTRACT

A monitoring apparatus is provided for a pressure tank, in particular in a motor vehicle. The monitoring apparatus is designed to determine current operating parameters of the pressure tank and, on the basis of the operating parameters, to calculate and preferably to display a maximum possible filling level for the pressure tank under the current operating parameters.

11 Claims, 1 Drawing Sheet

(51) Int. Cl.
*F02D 19/02* (2006.01)
*F17C 9/00* (2006.01)

(52) U.S. Cl.
CPC ............ *F02M 21/0293* (2013.01); *F17C 9/00* (2013.01); *F17C 2203/0629* (2013.01); *F17C 2205/0326* (2013.01); *F17C 2221/012* (2013.01); *F17C 2223/0161* (2013.01); *F17C 2223/033* (2013.01); *F17C 2227/0309* (2013.01); *F17C 2227/0323* (2013.01); *F17C 2227/0374* (2013.01); *F17C 2250/032* (2013.01); *F17C 2250/043* (2013.01); *F17C 2250/0404* (2013.01); *F17C 2250/0439* (2013.01); *F17C 2250/0443* (2013.01); *F17C 2250/0491* (2013.01); *F17C 2250/0495* (2013.01); *F17C 2250/0626* (2013.01); *F17C 2250/0631* (2013.01); *F17C 2265/066* (2013.01); *F17C 2270/0168* (2013.01); *Y02E 60/321* (2013.01); *Y02T 10/32* (2013.01)

(58) Field of Classification Search
CPC ............ F17C 2270/0184; F17C 11/005; F17C 2223/0123; F17C 2270/0168; F17C 2223/0161; F17C 2225/0153; F02M 21/0206
USPC ..... 123/527, 557, 434; 73/290, 302; 702/50, 702/55, 33, 57, 80
See application file for complete search history.

(56) References Cited

U.S. PATENT DOCUMENTS

| | | | | |
|---|---|---|---|---|
| 5,542,398 A * | 8/1996 | Marcon | F02M 21/0212 | 123/527 |
| 5,655,578 A * | 8/1997 | Farkas | B60K 15/04 | 141/4 |
| 6,073,081 A * | 6/2000 | Hettinger | F17C 5/02 | 702/50 |
| 6,076,546 A * | 6/2000 | Waters | F16K 31/26 | 137/390 |
| 6,782,339 B2 * | 8/2004 | Neeser | F17C 13/025 | 702/156 |
| 9,334,854 B2 * | 5/2016 | Minovitch | F03G 7/04 | |
| 2002/0014277 A1 * | 2/2002 | Togasawa | F16K 17/30 | 141/95 |
| 2006/0137332 A1 * | 6/2006 | Allgeier | B60K 15/03006 | 60/298 |
| 2008/0270162 A1 * | 10/2008 | Machacek | G05B 23/0221 | 702/182 |
| 2008/0280380 A1 * | 11/2008 | Dietz | F17C 11/00 | 438/14 |
| 2009/0155648 A1 * | 6/2009 | Lee | F17C 11/005 | 429/515 |
| 2009/0297896 A1 * | 12/2009 | Kimbara | F17C 11/005 | 429/437 |
| 2009/0308083 A1 * | 12/2009 | Brunner | F17C 5/007 | 62/50.2 |
| 2010/0089070 A1 | 4/2010 | Allgeier et al. | | |
| 2010/0101929 A1 * | 4/2010 | Kamen | B01D 1/28 | 202/185.3 |
| 2010/0122582 A1 * | 5/2010 | Hencken | G01F 1/002 | 73/861.15 |
| 2010/0236259 A1 | 9/2010 | Brunner et al. | | |
| 2010/0241371 A1 * | 9/2010 | Ammouri | F17C 13/021 | 702/55 |
| 2010/0250157 A1 * | 9/2010 | Ammouri | F17C 13/021 | 702/55 |
| 2010/0276027 A1 * | 11/2010 | Pucher | F02M 21/0224 | 141/1 |
| 2011/0252962 A1 * | 10/2011 | Von Helmolt | F17C 11/005 | 95/15 |
| 2013/0269828 A1 | 10/2013 | Mathison | | |
| 2015/0007584 A1 * | 1/2015 | Brunner | F17C 7/00 | 62/48.1 |
| 2015/0019054 A1 * | 1/2015 | Sangameswaran | B60K 35/00 | 701/22 |
| 2015/0276457 A1 * | 10/2015 | Dudar | G01F 23/18 | 73/290 R |

FOREIGN PATENT DOCUMENTS

| | | | | |
|---|---|---|---|---|
| CN | 103597267 A | 2/2014 | | |
| DE | 43 20 556 A1 | 12/1994 | | |
| DE | 102006025657 A1 * | 12/2007 | ............... | F17C 7/04 |
| DE | 10 2007 057 978 A1 | 6/2009 | | |
| DE | 10 2011 104 711 A1 | 12/2012 | | |
| DE | 10 2012 204 818 A1 | 9/2013 | | |
| DE | 10 2012 205 887 A1 | 10/2013 | | |
| DE | 10 2012 210 067 A1 | 12/2013 | | |
| DE | 10 2012 216 778 A1 | 5/2014 | | |
| DE | 10 2012 220 292 A1 | 6/2014 | | |
| JP | 2009-103246 A | 5/2009 | | |

OTHER PUBLICATIONS

German-language Written Opinion (PCT/ISA/237) issued in PCT Application No. PCT/EP2015/059649 dated Jun. 24, 2015 (five pages).
Chinese Office Action issued in Chinese counterpart application No. 201590027454.0 dated Apr. 26, 2018, with English translation (Thirteen (13) pages).
German Search Report issued in German counterpart application No. 10 2014 211 503.5 dated Apr. 10, 2019, with Statement of Relevancy (Eight (8) pages).
Chinese Rejection Decision issued in Chinese counterpart application No. 201580027454.0 dated Aug. 1, 2019, with English translation (Eight (8) pages).

* cited by examiner

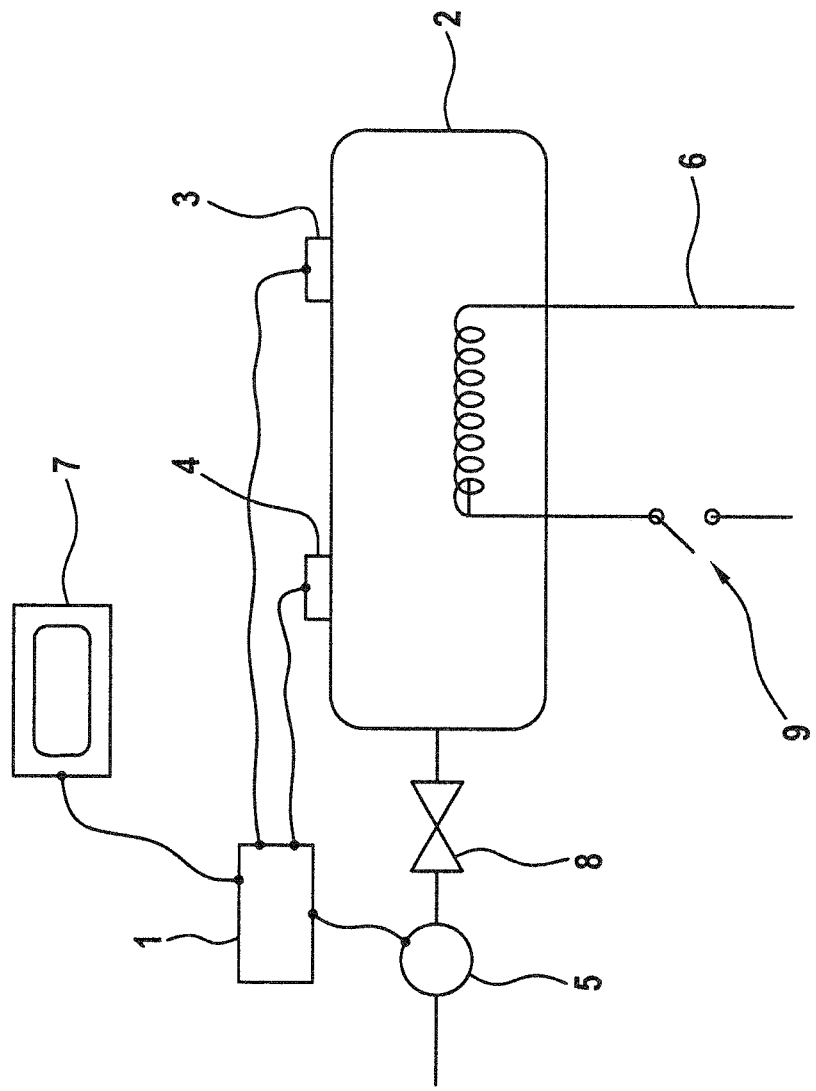

MONITORING APPARATUS FOR A PRESSURE TANK, AND PRESSURE TANK

CROSS REFERENCE TO RELATED APPLICATIONS

This application is a continuation of PCT International Application No. PCT/EP2015/059649, filed May 4, 2015, which claims priority under 35 U.S.C. § 119 from German Patent Application No. 10 2014 211 503.5, filed Jun. 16, 2014, the entire disclosures of which are herein expressly incorporated by reference.

BACKGROUND AND SUMMARY OF THE INVENTION

The present invention relates to a monitoring apparatus for a pressure tank. Furthermore, the invention relates to a pressure tank comprising such a monitoring apparatus. The pressure tank is, in particular, a cryogenic pressure tank.

It is known from prior art to use cryogenic pressure tanks in vehicles. Prior art also includes systems for displaying the filling level of the cryogenic pressure tank. This is especially important when the vehicle can be operated with a fuel that is stored in the cryogenic pressure tank. A display system for the filling level of the cryogenic pressure tank is known, in particular, from DE 10 2012 205 887 A1.

It is therefore the object of the invention to provide a monitoring apparatus for a pressure tank, as well as a pressure tank, which with simple and cost-efficient production and assembly allow a safe and reliable determination for a filling level of the pressure tank.

This and other objects of the invention are attained by a monitoring apparatus for a pressure tank that is set up to determine the current operating parameters of the pressure tank. The monitoring apparatus is furthermore set up to calculate, using the operating parameters, a maximum possible filling level for the pressure tank if the current operating parameters are maintained. In particular, a quick removal of medium from the pressure tank leads to operating parameters that allow only a low maximum possible filling level. This is the case in particular with the use of heat exchangers that were used in the quick removal of the medium to introduce heat into the pressure tank. This can be calculated by the monitoring apparatus. Thus, it is taken into account in the scope of the invention, for example, that a possible refueling density of a pressure tank depends on the temperature and pressure in the pressure tank.

The monitoring apparatus advantageously includes a temperature sensor. The temperature sensor can record a temperature within the pressure tank as an operating parameter of the pressure tank. Alternately or in addition, the monitoring apparatus includes a pressure sensor. The pressure sensor can record a pressure within the pressure tank as an operating parameter of the pressure tank. If there were a high temperature and a low pressure in the pressure tank, the maximum possible filling level of the pressure tank is less than if there is a lesser temperature at the same or higher pressure inside the pressure tank.

Preferably, the monitoring apparatus furthermore includes a flow sensor that can record an outflow mass stream from the pressure tank as an operating parameter of the pressure tank. In particular, a long and continuous extraction from the pressure tank allows a high maximum possible filling level of the pressure tank. The outflow mass stream can be alternately calculated from a change of the pressure and the temperature within the pressure tank over time. The pressure and the temperature can be recorded with the aforementioned sensors, i.e. the pressure sensor and the temperature sensor.

The monitoring apparatus advantageously has a memory element in which a value for a best possible filling level for the pressure tank is stored. A best-possible filling level for the pressure tank has been achieved when the pressure tank is completely empty without executing any additional measures, in particular such as introducing heat into the pressure tank. This means that the best possible filling level has been achieved when the tank has a pressure that is less than a predefined swelling pressure and a temperature that is less than a predefined swelling temperature. Because the best possible filling level depends only on the pressure tank and its insulation quality, the best possible filling level can be stored in the memory element. If the monitoring apparatus, using the operating parameters of the pressure tank, calculates a maximum possible filling level that is lower than the best possible filling level, the monitoring apparatus can advantageously calculate a ratio of maximum possible filling level to best possible filling level. Thus, a user receives information as to which part of the maximum possible capacity of the pressure tank can be used.

So as to facilitate the forwarding of information from the monitoring apparatus to a user, the monitoring apparatus advantageously includes a display device. On the display device, in particular the maximum possible filling level and/or the best possible filling level can be displayed. Furthermore, it is preferably provided that a current filling level of the pressure tank can be displayed on the display device. Because the monitoring apparatus is set up to always calculate the maximum possible filling level using the current operating parameters for the pressure tank, a user of the pressure tank receives an immediate feedback about the effect of the current operation of the pressure tank. In the case that the pressure tank is installed in a vehicle and stores fuels for the vehicle, the user receives, from the display device and the monitoring apparatus, current feedback about its current driving behavior.

The invention furthermore relates to a pressure tank comprising a monitoring apparatus as described above.

The pressure tank preferably has a heating device, wherein thermal energy can be introduced into the pressure tank by the heating device. In particular, thermal energy can be introduced into the pressure tank when a pressure within the pressure tank falls below a predefined minimum pressure. The minimum pressure is necessary to ensure that a user is supplied with medium from the pressure tank. However, because the pressure within the pressure tank drops as the removal of medium from the pressure tank increases, the remaining pressure, once it falls below the minimum pressure, is no longer sufficient to properly supply the user. However, so as to be able to use the medium remaining within the pressure tank, the pressure within the pressure tank can be increased by use of the heating device. Increasing the temperature of the pressure tank simultaneously leads to a lesser maximum possible filling level of the pressure tank, which can be calculated by the monitoring apparatus. In particular, such a reduction of the maximum possible filling level because of the heating device can be calculated by the monitoring apparatus and displayed on the display device.

Advantageously, the heating device is a heat exchanger. Preferably, the heat exchanger can be connected to a cooling system of a user that can be supplied with the contents of the pressure tank. Especially preferably, the pressure tank is provided in a vehicle, wherein an engine or a fuel cell of the vehicle can be supplied by the pressure tank. Thus, the heat exchanger can be connected with a cooling system of the engine or the fuel cell. Because the temperature in the pressure tank drops, in particular, during a quick extraction of medium from the pressure tank, whereas the quick extraction simultaneously indicates a high performance requirement for the user, which is to say the engine or the fuel cell, the pressure tank provides a cooling capability when the user requires a cooling capability. In this way, on the one hand, the user can be cooled, and on the other hand, a pressure increase can be realized in the tank by introducing heat.

Especially preferably, the heating device can be activated or deactivated by a user via a user interface. As described earlier, it is in particular provided that the effects of introducing heat into the pressure tank by the heating device can be displayed to the user. Therefore, the user interface makes it possible for the user to make the decision whether or not the heating device is to be used. In particular when the pressure tank supplies a drive of a vehicle, the user can decide whether its vehicle is to have a large range with the current refueling or whether its vehicle is to have a large range with the subsequent refueling. If the heating device is not used, the entire supply cannot be extracted from the pressure storage. Therefore, the range of the vehicle is less then the maximum possible. However, if the heating device is used, the temperature inside the pressure storage increases. This means that the vehicle can be used for a greater range, but at the same time, the maximum possible filling level of the pressure tank decreases. Thus, during a new refueling, the pressure tank cannot be filled to the best possible filling level, which means that the range of the vehicle is less after a refueling.

The pressure tank is preferably a cryogenic pressure tank. The cryogenic pressure tank can, in particular, store hydrogen. The hydrogen is used in particular as fuel for a motor vehicle, with the motor vehicle having a fuel cell or a hydrogen engine.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic representation of a pressure tank with a monitoring apparatus according to an exemplary embodiment of the invention.

DETAILED DESCRIPTION OF THE DRAWING

FIG. 1 shows a pressure tank 2 with a monitoring apparatus 1 according to an exemplary embodiment of the invention. The pressure tank 2 is a cryogenic insulated pressure tank that can store hydrogen in particular. The pressure tank 2 is advantageously provided in a vehicle and stores cryogenic hydrogen, wherein the cryogenic hydrogen is provided as a fuel for the vehicle.

The monitoring apparatus 1 includes a temperature sensor 3, a pressure sensor 4 and a flow sensor 5. Via these sensors 3, 4, 5, operating parameters of the pressure tank 2 can be recorded. With the temperature sensor 3, a temperature within the pressure tank 2 can be recorded; with the pressure sensor 4, a pressure within the pressure tank 2 can be recorded; and with the flow sensor 5, an outflow mass stream from the pressure tank 2 can be recorded. Alternately, via the change of pressure and temperature over time, the outflow mass stream can be calculated via the pressure sensor 2 and the temperature sensor 3. As another alternative, the flow can be determined directly by the user, for example by a fuel cell with produced current as measured variable. Finally, from these operating parameters, a maximum possible filling level of the pressure tank 2 can be calculated.

Furthermore, to use the pressure tank 2 as supply for a user, an extraction valve 8 is provided. The extraction valve 8 is advantageously controllable and controls an outflow of medium from the pressure tank 2. The flow sensor 5 is advantageously arranged directly at the extraction valve 8.

The monitoring apparatus 1 has a memory in which a best possible filling level that is characteristic for the pressure tank 2 is stored. Thus, the monitoring apparatus 1 can calculate which portion of the best possible filling level is provided by the maximum possible filling level at current operating parameters.

To represent the calculated information, the monitoring apparatus 1 is connected to a display device 7. On the display device 7, the maximum possible filling level for the pressure tank 2 and/or the best possible filling level for the pressure tank 2 and/or a current filling level for the pressure tank 2 can be displayed. Thus, a user can also recognize which capacity of the pressure tank 2 currently has been exhausted and which capacity is available. This capacity can be converted into a predicted range based on the consumption data and the stored characteristic curves, and displayed.

Finally, the pressure tank 2 has a heating device 6. The heating device 6 is a heat exchanger that can heat the pressure tank 2 and simultaneously cool a user that is connected to the pressure tank 2. Because, in particular, when extracting large quantities of medium from the pressure tank 2 over a short time, the temperature in the pressure tank 2 drops, while at the same time, the user generates a large quantity of waste heat because of the large quantity of energy from the pressure tank 2, an optimum cooling is ensured whenever it is needed. The heating device 6 makes it possible for the user to introduce heat into the pressure tank 2. Because a minimum pressure is required within the pressure tank 2 to generate an outflow mass stream from the pressure tank 2, a residual amount of medium always remains within the pressure tank 2. With the heating device 6, the pressure within the pressure tank 2 can be increased so that at least a part of the residual quantity of medium remaining in the pressure tank 2 can be extracted. However, because the temperature within the pressure tank 2 increases at the same time, the monitoring apparatus 1 calculates a drop of the maximum possible filling level for the pressure tank 2 based on the sensor values of the temperature sensor 3 and the pressure sensor 4, and displays it on the display device 7.

In particular, it is provided that the monitoring apparatus 1 determines the effect of the use of the heating device 6 on the maximum possible filling level for the pressure tank 2. This is relevant in particular when the pressure tank 2 supplies the drive of a vehicle. The display device 7 displays to the user of the vehicle how much range of the vehicle remains with the current filling level of the pressure tank 2. Furthermore, the user is shown on the display device 7 how much range the vehicle will have if the heating device 6 is used for introducing heat into the tank. At the same time, the effect of the use of the heating device 6 on the maximum possible filling level for the pressure tank 2 is displayed for the user on the display device 7.

Therefore, the user can decide, using the information on the display device 7, if it wants to use the heating device 6.

To that end, the heating device 6 has a user interface 9 via which the user can activate or deactivate the heating device 6. Thus, the user can alternately obtain a best possible filling level of the pressure tank 2 or quickly generate an optimum high range.

LIST OF REFERENCE SYMBOLS

1 Monitoring apparatus
2 Pressure tank
3 Temperature sensor
4 Pressure sensor
5 Flow sensor
6 Heating device
7 Display device
8 Extraction valve
9 User interface The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for a pressure tank, comprising:
 a monitoring device set up to determine current operating parameters of the pressure tank;
 wherein the monitoring device has a memory which stores a best possible filling level for the pressure tank that is characteristic for the pressure tank, wherein the best possible filling level is a maximum permissible capacity of the pressure tank, wherein the best possible filling level is achieved when the pressure tank is completely empty without introducing heat into the pressure tank, and thus, the best possible filling level has been achieved when the pressure tank has a pressure that is less than a predefined swelling pressure and a temperature that is less than a predefined swelling temperature; and, wherein the monitoring device calculates a ratio of a maximum possible filling level for the pressure tank at the current operating parameters to the best possible filling level.

2. The apparatus according to claim 1, further comprising:
 at least one temperature sensor that can record the temperature within the pressure tank as an operating parameter of the pressure tank and/or a pressure sensor that can record the pressure within the pressure tank as an operating parameter of the pressure tank.

3. The apparatus according to claim 2, further comprising:
 a flow sensor that can record an outflow mass stream from the pressure tank as an operating parameter of the pressure tank.

4. The apparatus according to claim 1, further comprising:
 a flow sensor that can record an outflow mass stream from the pressure tank as an operating parameter of the pressure tank.

5. The apparatus according to claim 1, further comprising:
 a display device on which the maximum possible filling level and the best possible filling level are displayed.

6. The apparatus according to claim 5, wherein a current filling level of the pressure tank is displayed on the display device.

7. A pressure tank, comprising an apparatus according to claim 1.

8. The pressure tank according to claim 7, further comprising a heating device, wherein the heating device can introduce thermal energy into the pressure tank.

9. The pressure tank according to claim 8, wherein the heating device is a heat exchanger connectable to a cooling system of a user that can be supplied with content of the pressure tank.

10. The pressure tank according to claim 8, wherein the heating device is activatable or deactivatable by a user via a user interface.

11. The pressure tank according to claim 7, wherein the pressure tank is a cryogenic pressure tank that stores hydrogen.

* * * * *